(12) United States Patent
Abedini et al.

(10) Patent No.: US 12,413,376 B2
(45) Date of Patent: Sep. 9, 2025

(54) SPECTRUM SENSING DURING INITIAL ACCESS TO A FULL-DUPLEX CELL

(71) Applicant: QUALCOMM Incorporated, San Diego, CA (US)

(72) Inventors: Navid Abedini, Basking Ridge, NJ (US); Yan Zhou, San Diego, CA (US); Qian Zhang, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/652,058

(22) Filed: Feb. 22, 2022

(65) Prior Publication Data

US 2023/0269776 A1 Aug. 24, 2023

(51) Int. Cl.
*H04W 74/0833* (2024.01)
*H04L 5/14* (2006.01)
*H04W 24/08* (2009.01)
*H04W 74/0808* (2024.01)

(52) U.S. Cl.
CPC .......... *H04W 74/0833* (2013.01); *H04L 5/14* (2013.01); *H04W 24/08* (2013.01); *H04W 74/0808* (2013.01)

(58) Field of Classification Search
CPC ............. H04W 74/0833; H04W 24/08; H04W 74/0808; H04L 5/14
See application file for complete search history.

(56) References Cited

U.S. PATENT DOCUMENTS

| | | | | |
|---|---|---|---|---|
| 2020/0266908 | A1* | 8/2020 | Qian | ............... H04L 5/0094 |
| 2022/0312504 | A1* | 9/2022 | Zhang | ........... H04W 74/0858 |
| 2023/0090986 | A1* | 3/2023 | Jang | ............... H04W 56/001 |
| | | | | 370/329 |

FOREIGN PATENT DOCUMENTS

WO WO-2021203282 A1 * 10/2021 ........... H04L 5/0053

OTHER PUBLICATIONS

Intel Corporation: "PHY Layer Enhancements for NR IAB", 3GPP TSG RAN WG1 #95, R1-1812486, 3rd Generation Partnership Project, Mobile Competence Centre, 650, Route Des Lucioles, F-06921 Sophia-Antipolis Cedex, France, vol. Ran WG1, No. Spokane, USA, Nov. 12, 2018-Nov. 16, 2018, Nov. 11, 2018, 13 pages, XP051554430, p. 9, paragraph 6—p. 10, p. 8, paragraph 5—p. 9, p. 9, paragraph 6—p. 10.
International Search Report and Written Opinion—PCT/US2023/013360—ISA/EPO—May 22, 2023.

* cited by examiner

*Primary Examiner* — Basil Ma
(74) *Attorney, Agent, or Firm* — Procopio, Cory, Hargreaves & Savitch LLP

(57) ABSTRACT

Apparatus, methods, and computer program products for using spectrum sensing and supporting FD operations are provided. An example method may include performing a spectrum sensing based on a set of resources or a configuration to acquire information about at least one of FD operation or CLI associated with one or more cells of a base station during initial access. The example method may further include selecting a RO or a cell of the one or more cells based on the acquired information about the at least one of the FD operation or the CLI.

30 Claims, 12 Drawing Sheets

Resources for reception    Resources for transmission

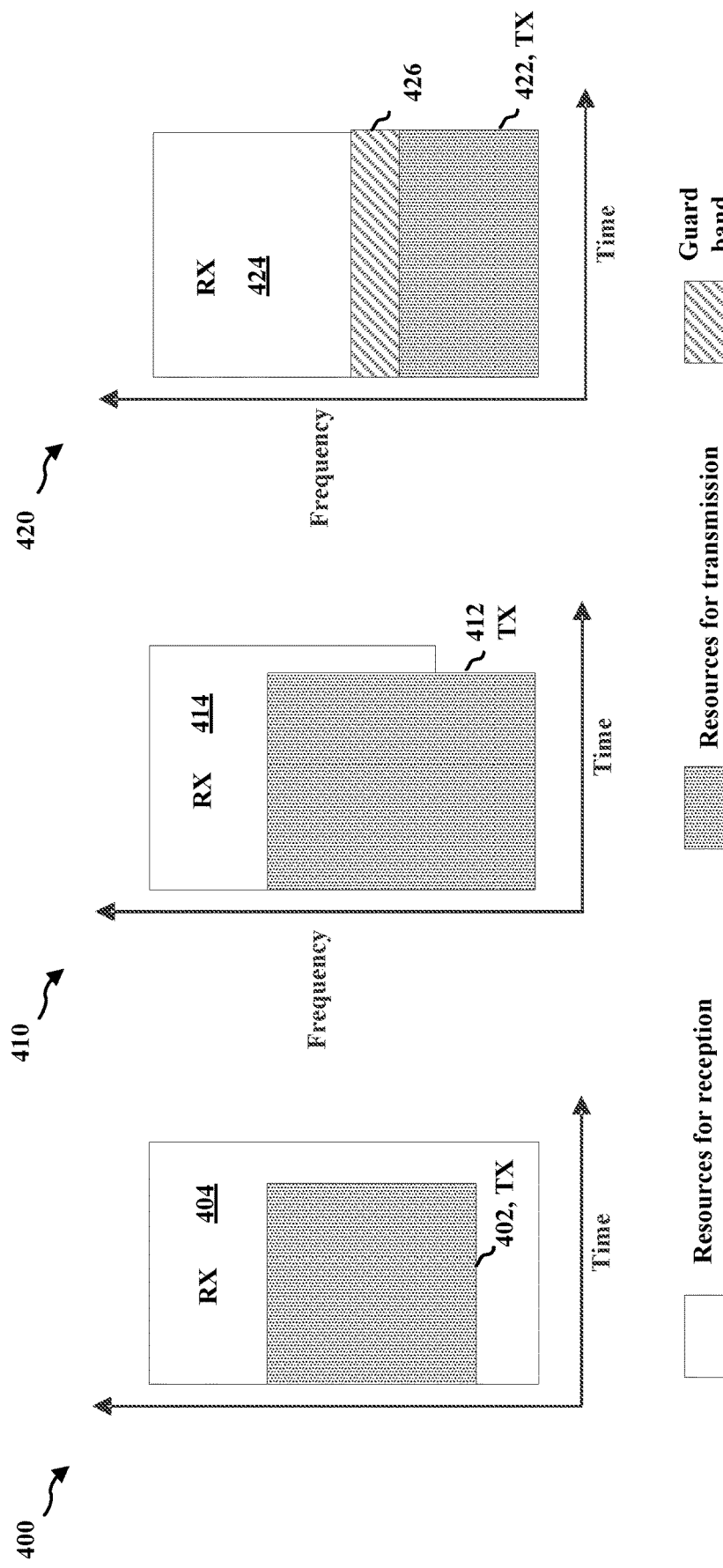

SPECTRUM SENSING DURING INITIAL ACCESS TO A FULL-DUPLEX CELL

TECHNICAL FIELD

The present disclosure relates generally to communication systems, and more particularly, to wireless communication systems with full-duplex (FD) cells.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be further configured to perform a spectrum sensing based on a set of resources or a configuration to acquire information about at least one of FD operation or cross link interference (CLI) associated with one or more cells of a base station during initial access. The memory and the at least one processor coupled to the memory may be further configured to select a random access channel (RACH) occasion (RO) or a cell of the one or more cells based on the acquired information about the FD operation or CLI.

In another aspect of the disclosure, a method, a computer-readable medium, and an apparatus are provided. The apparatus may include a memory and at least one processor coupled to the memory. The memory and the at least one processor coupled to the memory may be configured to transmit, to a UE, system information indicating a set of resources or a configuration for spectrum sensing, the spectrum sensing being associated with acquiring information about at least one of FD operation or CLI associated with one or more cells of the base station during initial access. The memory and the at least one processor coupled to the memory may be further configured to receive, from the UE, communication based on a selection of a RO or a cell of the one or more cells based on the acquired FD operation or CLI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A illustrates an example type of FD communication.

FIG. 4B illustrates an example type of FD communication.

FIG. 4C illustrates an example type of FD communication.

DETAILED DESCRIPTION

Figure 1:
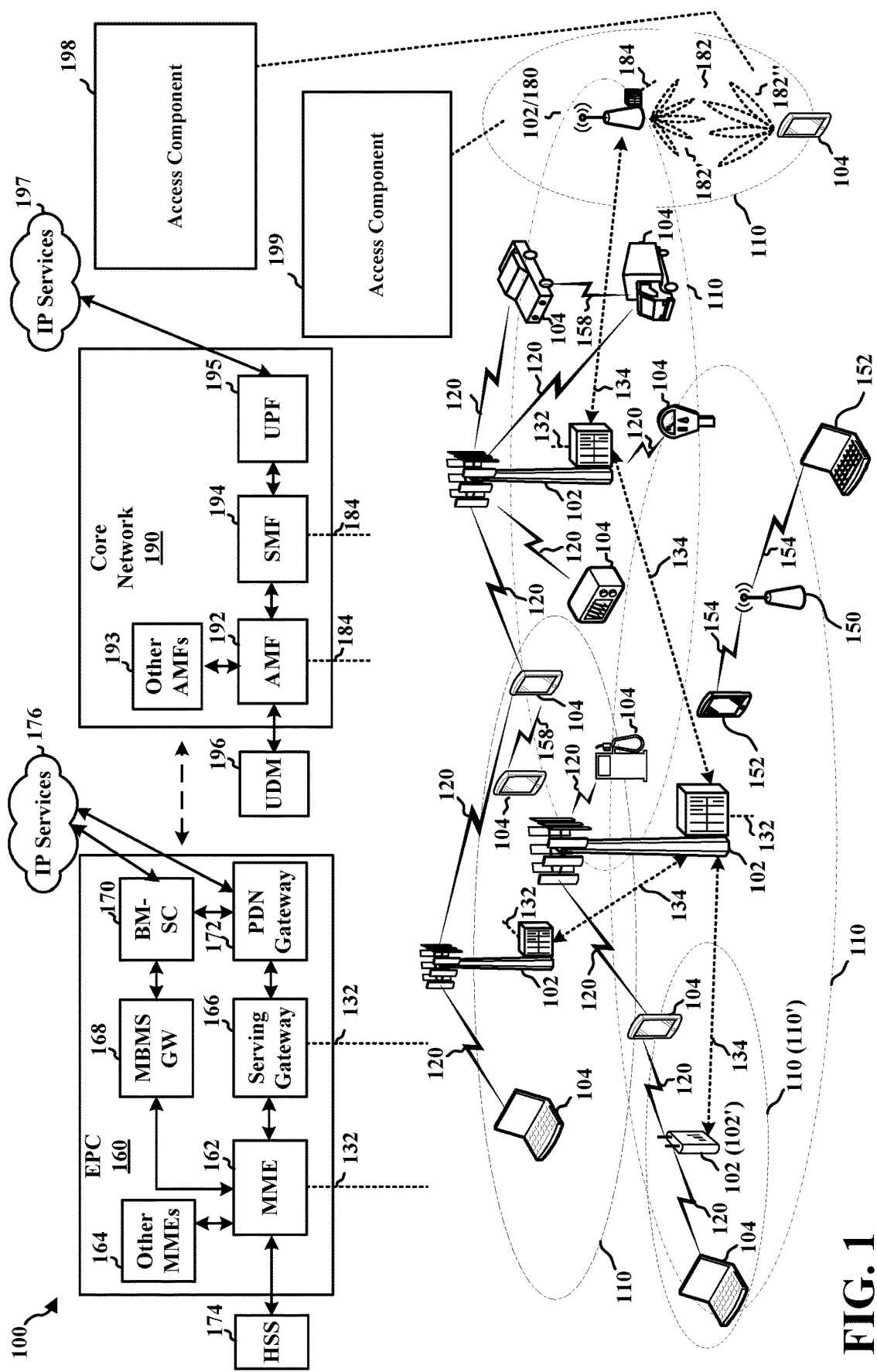
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an access component 198. In some aspects, the access component 198 may be configured to receive, from a base station, system information indicating a set of resources or a configuration for spectrum sensing. In some aspects, the access component 198 may be further configured to perform a spectrum sensing based on a set of resources or a configuration to acquire information about at least one of FD operation or CLI associated with one or more cells of a base station during initial access. In some aspects, the access component 198 may be further configured to select a RO or a cell of the one or more cells based on the acquired information about the FD operation or CLI.

In certain aspects, the base station 180 may include an access component 199. In some aspects, the access component 199 may be configured to transmit, to a UE, system information indicating a set of resources or a configuration for spectrum sensing, the spectrum sensing being associated with acquiring information about at least one of FD operation or CLI associated with one or more cells of the base station during initial access. In some aspects, the access component 199 may be further configured to receive, from the UE, communication based on a selection of a RO or a cell of the one or more cells based on the acquired information about the at least one of the FD operation or the CLI.

Although the following description may be focused on 5G NR, the concepts described herein may be applicable to other similar areas, such as LTE, LTE-A, CDMA, GSM, and other wireless technologies.

Figure 2:
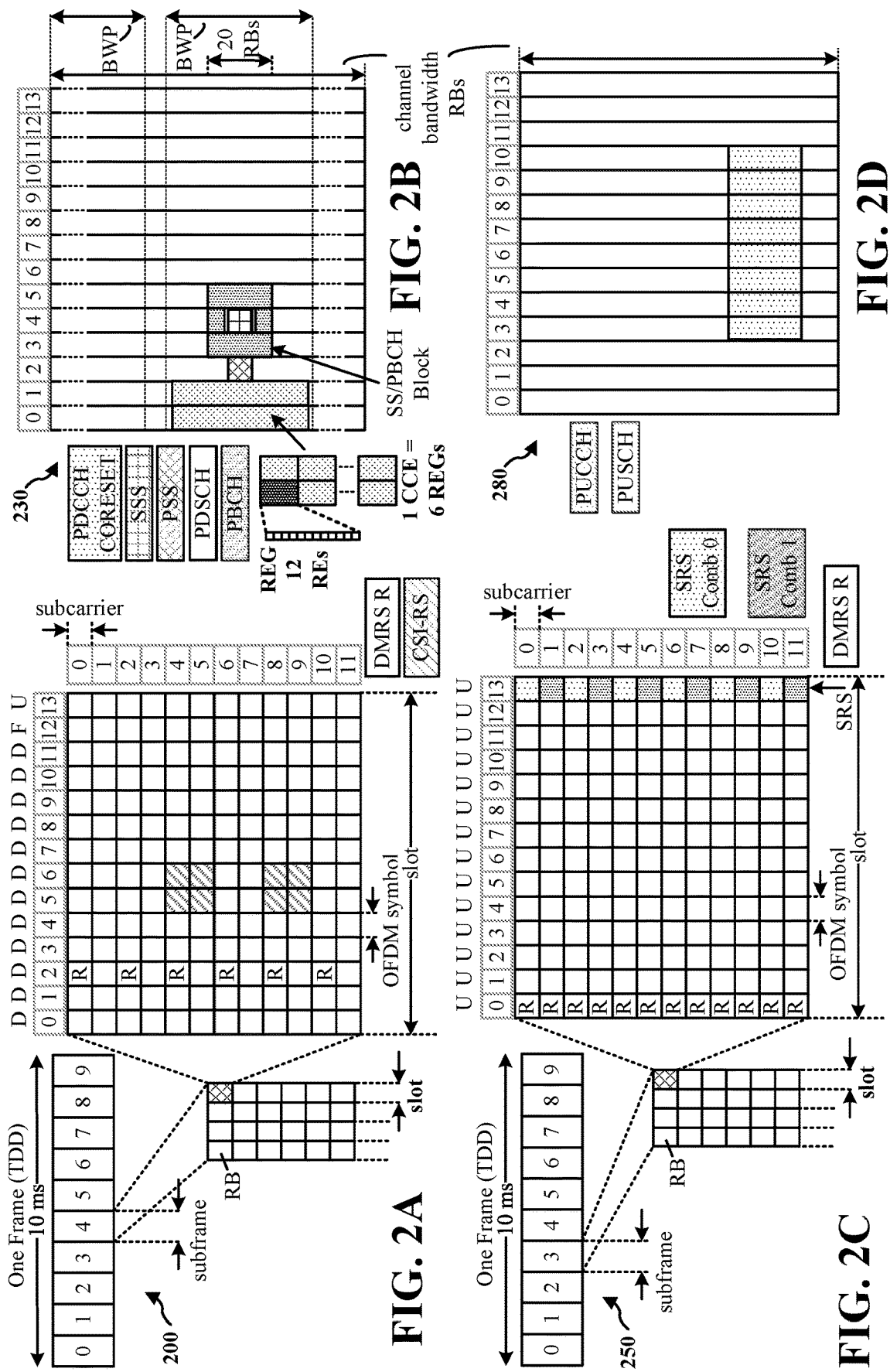
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
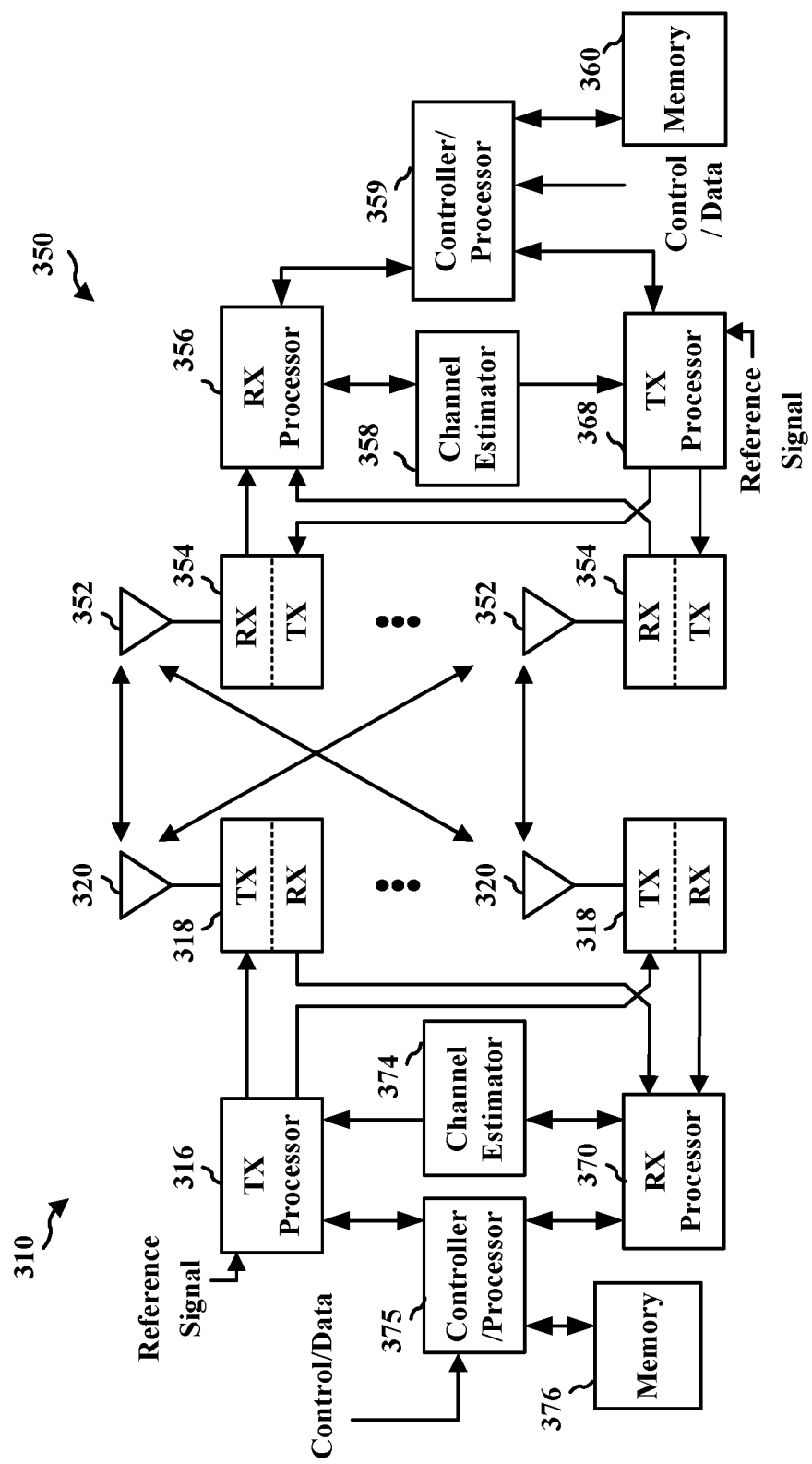
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC)

layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with access component 198 of FIG. 1.

At least one of the TX processor 316, the RX processor 370, and the controller/processor 375 may be configured to perform aspects in connection with access component 199 of FIG. 1.

In some wireless communication systems, FD capability (supporting simultaneous UL or DL transmission) may be present at the base station, the UE, or both the base station and the UE. For example, at the UE, UL transmissions may be transmitted from a first panel of the UE while simultaneous DL receptions may be received at a second panel of the UE. The first panel and the second panel may be different panels of the antenna(s) on the UE. As another example, at the base station, UL receptions may be received from a first panel of the base station while simultaneous DL transmissions may be transmitted at a second panel of the base station. The first panel and the second panel may be different panels of the antenna(s) on the base station.

FIG. 4A illustrates an example 400 of in-band full-duplex (IBFD) resources (which may also be referred to as single-frequency full-duplex). FIG. 4B illustrates an example 410 of IBFD resources. FIG. 4C illustrates an example 420 of sub-band full-duplex resources. In IBFD, signals may be transmitted and received in overlapping times and overlapping in frequency. As shown in the example 400 illustrated in FIG. 4A, a time and a frequency allocation of transmission resources 402 may fully overlap with a time and a frequency allocation of reception resources 404. In the example 410 illustrated in FIG. 4B, a time and a frequency allocation of transmission resources 412 may partially overlap with a time and a frequency of allocation of reception resources 414.

IBFD is in contrast to sub-band frequency division duplex (FDD), where transmission and reception resources may overlap in time using different frequencies, as shown in the example 420 illustrated in FIG. 4A. In the example 420, the transmission resources 422 are separated from the reception resources 424 by a guard band 426. The guard band may be frequency resources, or a gap in frequency resources, provided between the transmission resources 422 and the reception resources 424. Separating the frequency resources for transmission and reception with a guard band may help to reduce self-interference. Transmission and reception resources that are immediately adjacent to each other may be considered as having a guard band width of 0. As an output signal, e.g., from a UE transmitter may extends outside the transmission resources, the guard band may reduce interference experienced by the UE. Sub-band FDD may also be referred to as "flexible duplex."

As previously described, an FD network node, such as a base station or UE in the cellular network, may communicate simultaneously in UL and DL with two half-duplex panels using the same radio resources. Due to the simultaneous Tx/Rx nature of FD communication, a UE may experience self-interference caused by signal leakage from the transmitting panel to the receiving panel. Such interference (e.g., self-interference or interference caused by other devices) may impact the quality of the communication or even lead to a loss of information. Therefore, beam separations and other mitigation methods may be used to support FD capability. Cluster echo (which may be otherwise referred to as "cluster interference") from surrounding objects may also be present. Therefore, a UE capable of FD communication may not always work in FD mode due to the potentially high interference.

By supporting FD, latency of communications may be potentially reduced. For example, it may be possible for a UE to receive DL signal in slots assigned for UL, which may enable latency savings. Furthermore, by supporting FD, spectrum efficiency per cell and per UE may be improved because resource utilization over the spectrum may be more efficient.

Figures 5A, 5B, 5C:
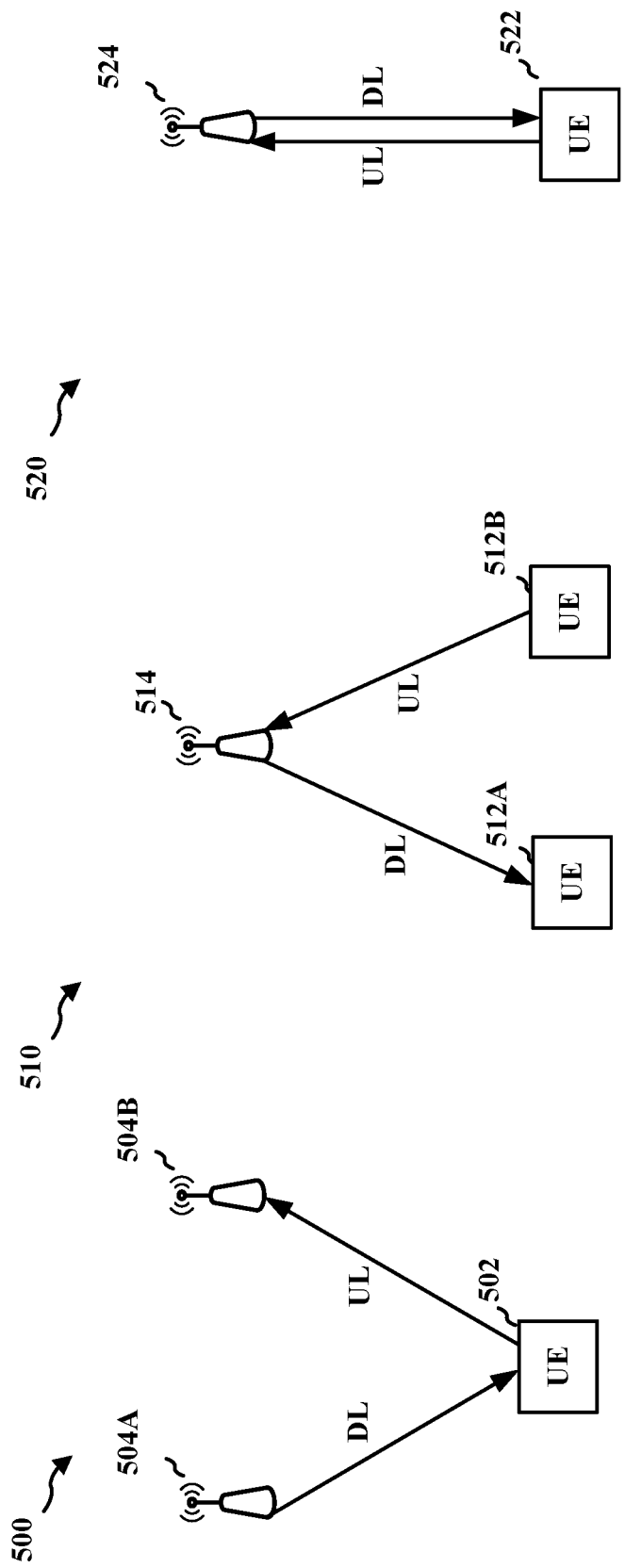
FIG. 5A illustrates an example use case of FD communication.
FIG. 5B illustrates an example use case of FD communication.
FIG. 5C illustrates an example use case of FD communication.

FIGS. 5A-C illustrate various use cases of FD communication. Referring to FIG. 5A, as shown in example 500, an FD UE 502 may be simultaneously connected to a first TRP 504A and a second TRP 504B. The FD UE 502 may be receiving DL communications from the first TRP 504A while transmitting UL communications to the second TRP 504B. In some aspects, the first TRP 504A and the second TRP 504B may be half-duplex (HD) and may not support FD operations. In some aspects, the first TRP 504A and the second TRP 504B may support FD operations.

Referring to FIG. 5B, as shown in example 510, an FD TRP 514 of a base station may be transmitting DL communications to a first UE 512A while receiving UL communications from a second UE 512B. In some aspects, the first UE 512A and the second UE 512B may be HD and may not support FD operations. In some aspects, the first UE 512A and the second UE 512B may support FD operations.

Referring to FIG. 5C, as shown in example 520, an FD TRP 524 of a base station may be transmitting DL communications to an FD UE 522 while receiving UL communications from the FD UE 522. The FD UE 522 may be transmitting UL communications to the FD TRP 524 while receiving DL communications from the FD TRP 524.

For an FD TRP of a base station communication with a first UE and a second UE that may be both HD (e.g., example 510), the HD UEs may benefit from the potential advantages of latency saving, better spectrum efficiency, or other efficiencies resulting from the base station operating in FD. On the other hand, the HD UEs may also experience extra CLI between the HD UEs due to the FD operations of the TRP. For example, during a slot where the first UE 512A receives DL communications, the nearby second UE 512B may be sending UL communications to the TRP, which may potentially cause CLI to the first UE 512A.

There are different ways to address the potential CLI. For example, the network may configure CLI resources for the UEs to measure and report CLI. After receiving reports on CLI, by pairing the first UE and the second UE and accordingly scheduling the UL/DL communications for the first UE and the second UE, the base station may operation in FD and simultaneously serve DL and UL UEs with minor CLI. However, sometimes CLI may be present in initial access (e.g., when ROs for one UE overlaps with DL communications for another UE). Therefore, the network may configure cell-specific CLI resources (e.g., in a broadcast manner), during which connected UEs may be configured to send SRS. An initial access UE may measure CLI from neighboring UE and decide whether the initial access UE may use a full-duplex RO (overlapping with DL reception of nearby UEs) without causing excessive CLI to other nearby UEs or not based on the measurement. The SRS may be periodic and so that the initial access UEs may be able to measure CLI and accordingly select FD RO or HD FO. However, such SRS may introduce overhead for the connected UEs sending the SRS. Aspects provided herein may use spectrum sensing during the initial access for cell selection or RO selection, preventing overhead for the connected UEs while resolving the potential CLI issue for initial access UEs. Spectrum sensing may be the process of observing the frequency bands and sensing activities originated from other devices in the frequency band. In some aspects, the initial access UE may perform spectrum sensing during the initial access to acquire information about the FD operation or CLI profile of a cell.

In some aspects of wireless communications, such as during initial access, a UE may use a RACH procedure in order to communicate with a base station. For example, the UE may use the random access procedure to request a radio resource control (RRC) connection, to re-establish an RRC connection, to resume an RRC connection, etc. RACH procedures may include a number of different types of random access procedures, e.g., contention based random access (CBRA) may be performed when a UE is not synchronized with a base station and contention free random access (CFRA) may be performed when a UE was previously synchronized with a base station. In CBRA, a UE may randomly select a RACH preamble sequence, e.g., from a set of RACH preamble sequences. As the UE randomly selects the RACH preamble sequence, the base station may receive another RACH preamble from a different UE at the same time. Thus, CBRA provides for the base station with the ability to resolve such contention among multiple UEs. In CFRA, the network may allocate a RACH preamble sequence to the UE rather than the UE randomly selecting a RACH preamble sequence. This may help to avoid potential collisions with a RACH preamble from another UE using the same sequence. Thus, CFRA may be referred to as "contention free" random access.

Figure 6:
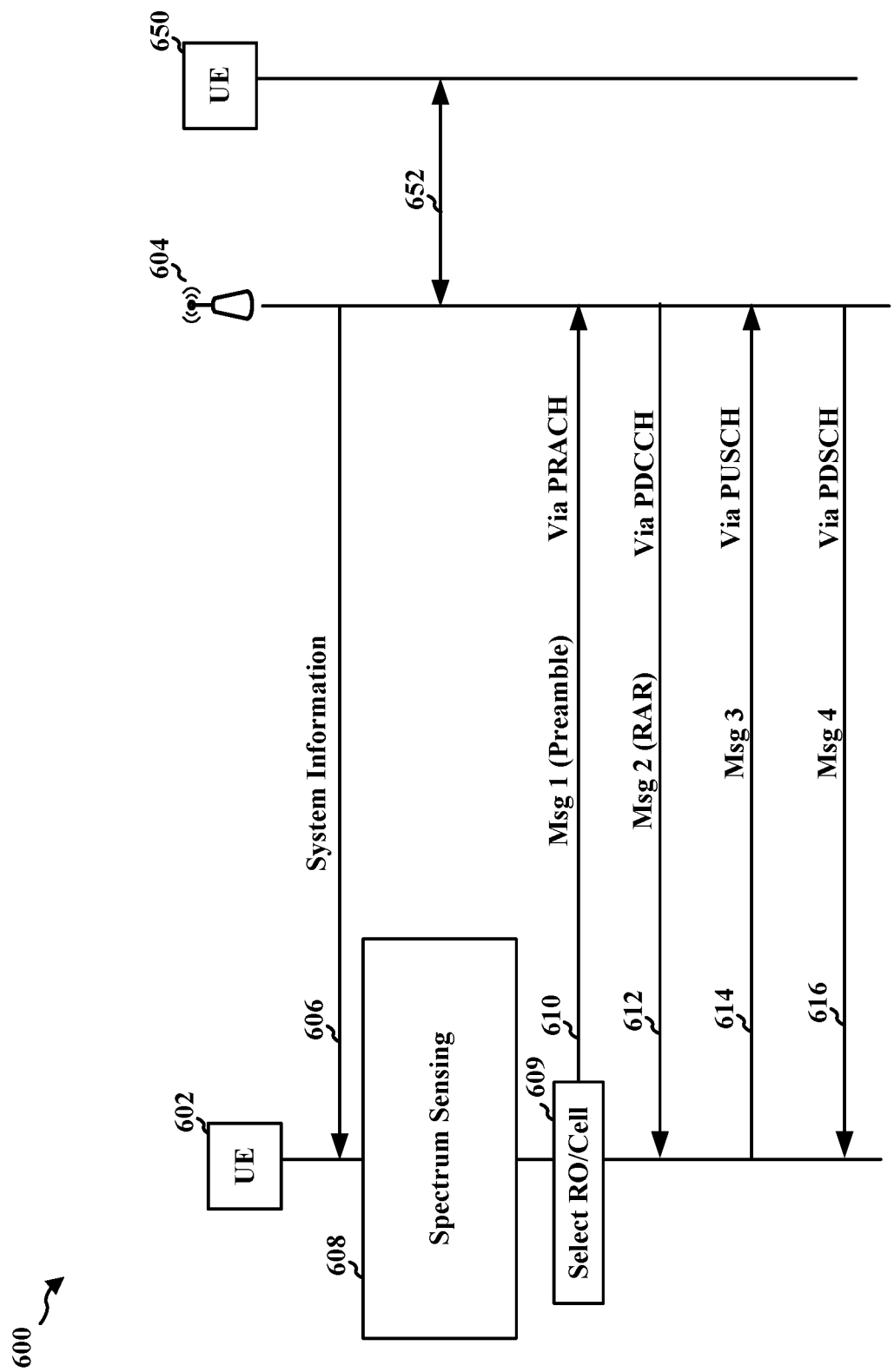
FIG. 6 illustrates example communications between base station and UE(s) in a wireless communication system.

FIG. 6 is a diagram 600 illustrating an example RACH procedure between a UE 602 and a base station 604. In some aspects, the UE 602 may be an initial access UE and may obtain random access parameters (which may be otherwise referred to as PRACH configurations), e.g., including RACH preamble format parameters, PRACH resources (in the form of time and frequency), parameters for determining root sequences and/or cyclic shifts for a RACH preamble, etc., in system information 606 from the base station 604. In some aspects, the system information 606 may further indicate one or more resources and a configuration for the UE 602 to perform spectrum sensing at 608.

In some aspects, the system information 606 may indicate time-domain resources, such as a set of UL or FD symbols or slots, that may be used for spectrum sensing. In some aspects, the system information 606 may indicate symbols or slots that may be used for spectrum sensing implicitly. For example, the system information 606 may indicate that all UL symbols, all flexible (that could be used for UL and DL) symbols, or all FD symbols indicated in a time division duplex (TDD) configuration may be used for spectrum sensing.

In some aspects, the system information 606 may indicate frequency domain resources that may be used for performing spectrum sensing at 608. For example, the frequency domain resources may be an initial UL bandwidth part (BWP), an indicated BWP for FD operations, or another defined BWP. In some aspects, the frequency domain resources may be a collection of staggered resource block (RB) groups. In some aspects, the frequency domain resources may be different for different time-domain symbols/slots. For example, for a first slot/symbol, an initial UL BWP may be indicated to be used for spectrum sensing. For a second slot/symbol, an indicated BWP for FD operations may be indicated to be used for spectrum sensing.

In some aspects, the system information 606 may indicate a window prior to one or more ROs that may carry RACH preambles within which the indicated UL/FD resources may be sensed. In some aspects, the system information 606 may configure one or more conditions for selecting a RO. The one or more conditions may include a threshold on measured (e.g., averaged) received signal strength indicator (RSSI) or a highest measured RSSI, or a number of resources where measured RSSI being above a threshold, or other statistics related to measurements that may be performed during spectrum sensing at 608.

In some aspects, the one or more resources that may be indicated by the system information 606 to be for spectrum sensing for the UE 602 may be used by connected UEs, such as a UE 650, to exchange communications 652 such as transmitting UL transmissions with the base station 604. In some aspects, there may be no extra UL signals for CLI measurements for the spectrum sensing at 608. In some aspects, the connected UEs, such as the UE 650, may transmit UL communications normally without considering that the resources may be used by the UE 602 for spectrum sensing. In some aspects, based on the measured RSSI during the spectrum sensing at 608, the UE 602 may perform RO selection 609 based on the one or more conditions. In some aspects, the UE 602 may perform RO selection 609 based on a set of conditions configured for/determined by the UE without base station signaling.

In some aspects, based on the spectrum sensing at 608, the UE 602 may determine the profile and severity of CLI. Based on the profile and severity of CLI, the UE 602 may also perform cell selection at 609. For example, the UE may have detected two cells and may acquire more information during the spectrum sensing at 608 to sub-select one of the two cells. In some aspects, an FD cell or another cell with less chance of high CLI may be selected by the UE 602 for further transmission of random access messages. In some aspects, the UE 602 may select the cell based on criteria configured for/determined by the UE without base station signaling.

In some aspects, the system information 606 may not explicitly indicate information about resources that may be used for CLI measurement. In such aspects, the UE 602 may, based on TDD and BWP configuration in the system information 606, select resources for the spectrum sensing at 608. In some aspects, the UE 602 may acquire information about FD resources (e.g., based on TDD indication in remaining minimum system information (RMSI)). Then the UE 602 may decide to perform spectrum sensing within the FD resources at 608.

In some aspects, the spectrum sensing at 608 may include RSSI measurement and further processing based on RSSI measurements. For example, measured RSSI within resources with both DL and UL communications may include total reception power from both the base station 604 and nearby UEs. Therefore, the UE 602 may not differentiate and separately measure CLI caused by the UEs. The spectrum sensing at 608 may include further processing to estimate the CLI caused by the UEs. For example, in some aspects, the UE may separately measure (e.g., and may average) RSSI over DL resources that do not have UL transmissions. Based on the RSSI over the DL resources that do not have UL transmissions and a total measured RSSI over full-duplex resources, the UE 602 may estimate average CLI-RSSI caused by other UEs' UL transmissions. For example, total RSSI minus DL RSSI may be equal to an estimate of UL/CLI RSSI caused by other UEs' UL transmissions.

As another example, in some aspects, the UE 602 may assume that DL transmission may spans wider bandwidth (BW) or may be associated with a more uniform power spectral density (PSD). The UE 602 may identify and distinguish UL from DL based on the measured spectrum. Further details of example measured spectrums are described in connection with FIGS. 7A-7C. As another example, in some aspects, the UE 602 may not have prior information about FD resources. For example, based on spectrum sensing and evaluating the estimated power spectrum, the UE 602 may determine the time resources where both DL and UL present (i.e., measured spectrum matches a mixture of DL and UL), and may estimate the UL/CLI RSSI caused by other UEs' UL transmissions accordingly. In another example, in some aspects, the UE 602 may estimate whether a cell is an FD cell based on whether both DL and UL are present. The UE 602 may accordingly select a cell estimated to be FD that may support FD operation or select another cell.

After selecting RO(s) or cells, the UE 602 may initiate the random access message exchange by sending, to the base station 604, a first random access message 610 (e.g., message 1 (Msg 1)) including a RACH preamble. In some aspects, multiple short preambles may be multiplexed in time within a single RO. Prior to sending the first random access message 610, the UE may configure a RACH preamble parameter including a cyclic prefix (CP) and a preamble sequence. Each of the preamble formats may be associated with a different CP and a different preamble sequence. A preamble format may be grouped into two categories: long preamble and short preamble. By way of example, a long preamble may last for more than 1 ms in the time domain and a short preamble may last for less than 1 ms in the time domain. For example, a long preamble may be based on a sequence length of L=839. A long preamble may include preamble format 0, format 1, format 2, and format 3. By way of example, an SCS associated with a long preamble may be 1.25 kHz or 5 kHz. A long preamble may be used for the FR1 frequency band. A long preamble with 1.25 kHz SCS may occupy, by way of example, 6 resource blocks in the frequency domain. A long preamble with 5 kHz may occupy, by way of example, 24 resource blocks in the frequency domain.

A RACH preamble may be transmitted with an identifier, such as a random access RNTI (RA-RNTI). The UE 602 may randomly select a RACH preamble sequence, e.g., from a set of RACH preamble sequences corresponding to the preamble formats. If the UE 602 randomly selects the RACH preamble sequence, the base station 604 may receive another RACH preamble from a different UE at the same time. In some examples, a RACH preamble sequence may be assigned to the UE 602.

The base station may respond to the first random access message 610 by sending a second random access message 612 (e.g., Msg 2 or Msg2) using a PDSCH and including a random access response (RAR). The RAR may include, e.g., an identifier of the RACH preamble sent by the UE, a timing advance (TA), an uplink grant for the UE to transmit data, a cell radio network temporary identifier (C-RNTI) or other identifier, and/or a back-off indicator. Upon receiving the RAR (e.g., 612), the UE 602 may transmit a third random access message 614 (e.g., Msg 3 or Msg3) to the base station 604, e.g., using a PUSCH, that may include an RRC connection request, an RRC connection re-establishment request, or an RRC connection resume request, depending on the trigger for initiating the random access procedure. The base station 604 may then complete the random access procedure by sending a fourth random access message 616 (e.g., Msg 4 or Msg4) to the UE 602, e.g., using a PDCCH for scheduling and a PDSCH for the message. The fourth random access message 616 may include a random access response message that includes timing advancement information, contention resolution information, and/or RRC connection setup information. The UE 602 may monitor for a PDCCH, e.g., with the C-RNTI. If the PDCCH is successfully decoded, the UE 602 may also decode a PDSCH. The UE 602 may send HARQ feedback for any data carried in the fourth random access message.

In some wireless communication systems, the UE 602 may request a Msg 3 PUSCH repetition. For example, the UE 602 may request a Msg 3 PUSCH repetition to improve coverage. In some wireless communication systems, the UE 602 may request the Msg 3 PUSCH repetition via PRACH resources. In some aspects, the UE 602 may indicate the request via RACH occasions (ROs). In some aspects, the UE 602 may not indicate the request via ROs. The UE 602 may request the Msg 3 PUSCH repetition based on different criteria, such as a synchronization signal (SS) reference signal received power (RSRP). The UE 602 may also transmit one or more PRACH repetitions using the PRACH resources that may carry requests for Msg 3 PUSCH repetitions. Aspects provided herein may enable implicitly indicating Msg 3 PUSCH repetitions via PRACH repetitions, which may improve the efficiency of a RACH procedure between a UE and a base station.

Figure 7:
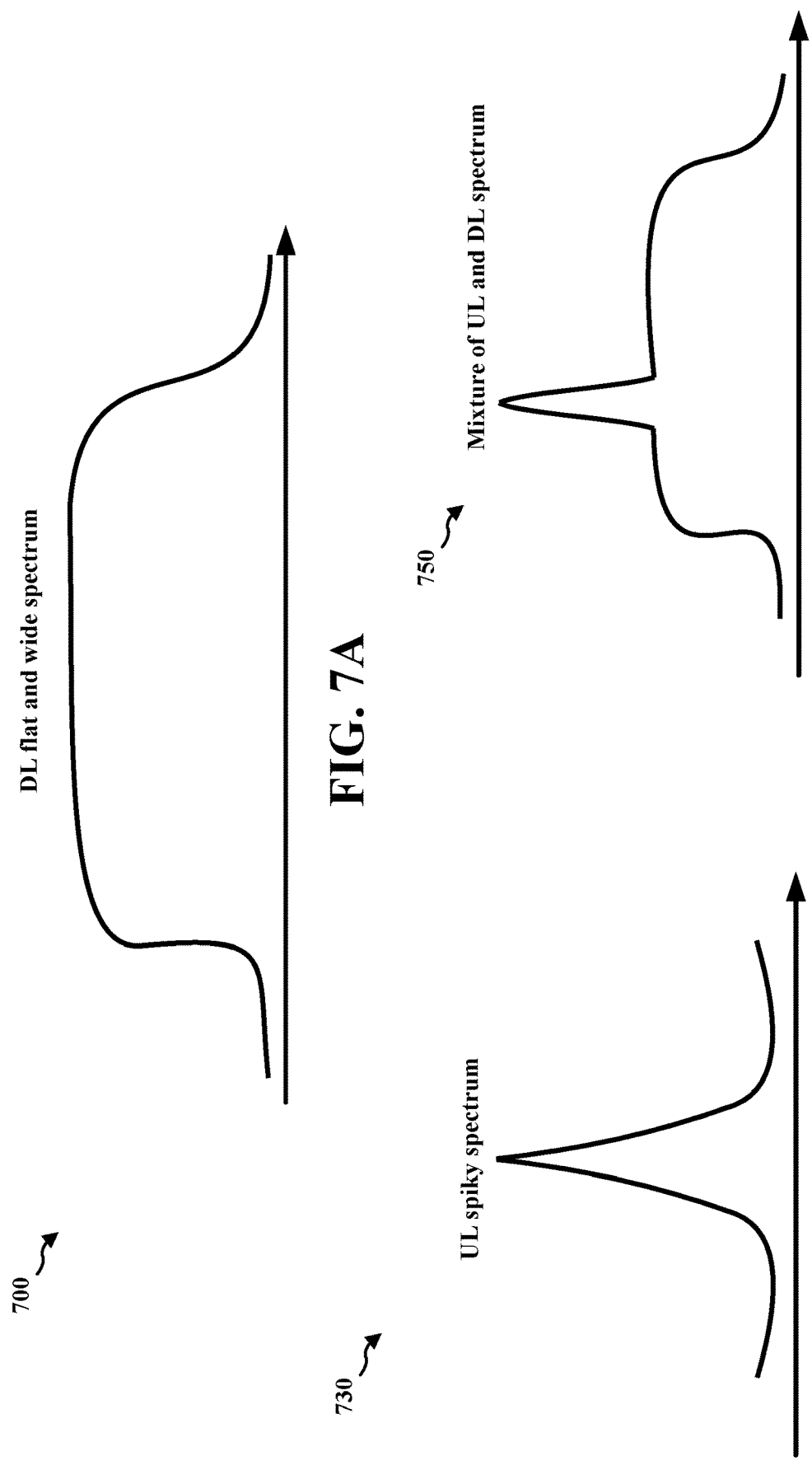
FIG. 7A illustrates an example sensed spectrum.
FIG. 7B illustrates an example sensed spectrum.
FIG. 7C illustrates an example sensed spectrum.

FIGS. 7A-C illustrate example sensed spectrums. As illustrated in example 700 of FIG. 7A, a DL spectrum measured based on resources that may be used for DL without being used for UL may be flat and wide. As illustrated in example 730 of FIG. 7B, a UL spectrum measured based on resources that may be used for UL without being used for DL may be spiky. As illustrated in example 750 of FIG. 7C, a mixture UL and DL spectrum measured based on resources that may be used for UL and DL may exhibit characteristics of both DL and UL spectrums.

Figure 8:
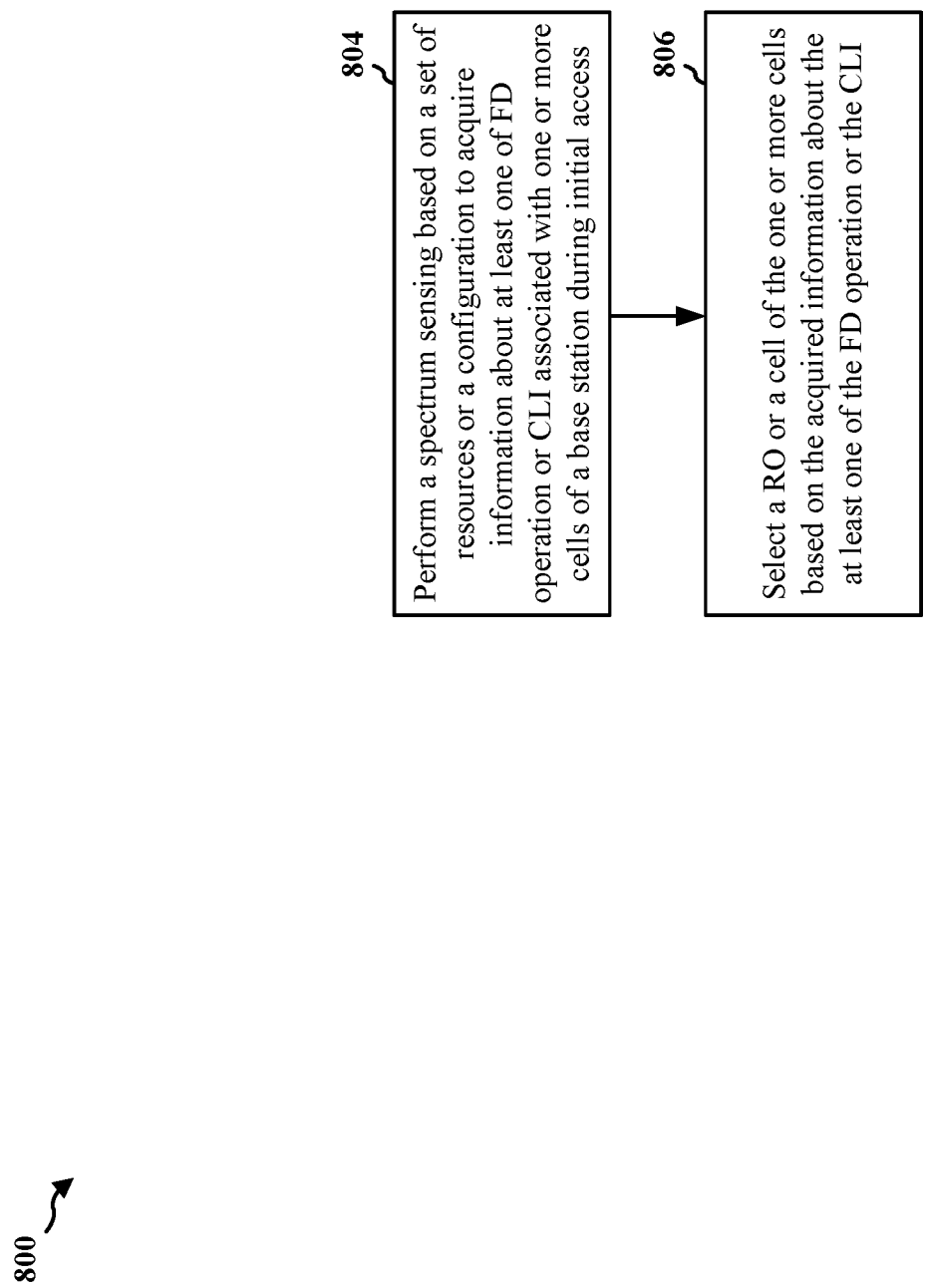
FIG. 8 is a flowchart of a method of wireless communication.

FIG. 8 is a flowchart 800 of a method of wireless communication. The method may be performed by a UE (e.g., the UE 104, the UE 602; the apparatus 1102).

At 804, the UE may perform a spectrum sensing based on a set of resources or a configuration to acquire information about at least one of FD operation or CLI associated with one or more cells of a base station during initial access. For example, the UE 602 may perform the spectrum sensing at 608 based on the set of resources or the configuration to acquire information about at least one of FD operation or CLI associated with one or more cells of a base station during initial access. In some aspects, 804 may be performed by access component 1142 in FIG. 11.

At 806, the UE may select a RO or a cell of the one or more cells based on the acquired information about the at least one of the FD operation or the CLI. For example, the UE 602 may select a RO or a cell of the one or more cells based on the acquired information about the at least one of the FD operation or the CLI at 609. In some aspects, 806 may be performed by access component 1142 in FIG. 11.

Figure 9:
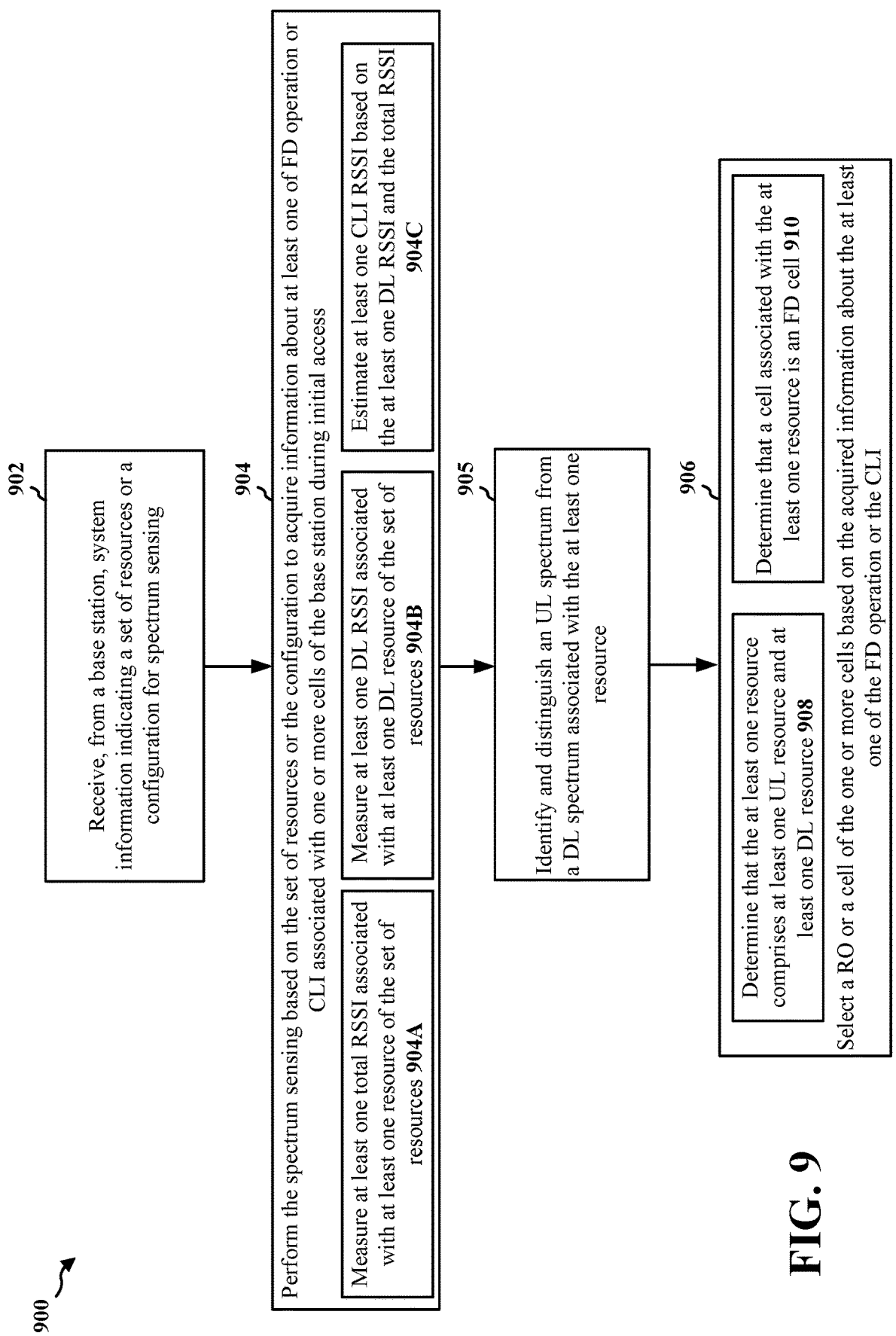
FIG. 9 is a flowchart of a method of wireless communication.

FIG. 9 is a flowchart 900 of a method of wireless communication. The method may be performed by a UE (e.g., the UE 104, the UE 602; the apparatus 1102).

At 902, the UE may receive, from a base station, system information indicating a set of resources or a configuration for spectrum sensing. For example, the UE 602 may receive, from a base station 604, system information 606 indicating a set of resources or a configuration for spectrum sensing at 608. In some aspects, 902 may be performed by access component 1142 in FIG. 11. In some aspects, the set of resources may include one or more time domain resources including one or more UL or FD symbols or slots associated with the spectrum sensing. In some aspects, the one or more UL or FD symbols or slots associated with the spectrum sensing may include all UL symbols or slots, all flexible symbols or slots, or all FD symbols or slots associated with a TDD configuration. In some aspects, the set of resources may include one or more frequency domain resources. In some aspects, the one or more frequency domain resources may include an initial UL BWP. In some aspects, the one or more frequency domain resources may include a dedicated BWP for the FD operation. In some aspects, the one or more frequency domain resources may include a collection of staggered RB groups. In some aspects, the one or more frequency domain resources may include at least one different frequency domain resource associated with at least one different time domain resource. In some aspects, the set of resources may include a time window prior to the RO. In some aspects, the configuration may include one or more conditions associated with a selection of the RO or the one or more cells (e.g., one cell of the one or more cells). In some aspects, the one or more conditions may include one or more of: an average RSSI threshold, a highest RSSI threshold, or a number of resources associated with an RSSI above a threshold. In some aspects, the set of resources may overlap with a set of resources configured for UL communication for a connected UE. In some aspects, the one or more FD resources may include one or more TDD indications in RMSI.

At 904, the UE may perform a spectrum sensing based on a set of resources or a configuration to acquire information about at least one of FD operation or CLI associated with one or more cells of the base station during initial access. For example, the UE 602 may perform the spectrum sensing at 608 based on the set of resources or the configuration to acquire information about at least one of FD operation or CLI associated with one or more cells of the base station during initial access. In some aspects, 904 may be performed by access component 1142 in FIG. 11. In some aspects, as part of 904, the UE may, at 904A, measure at least one total RSSI associated with at least one resource of the set of resources. In some aspects, as part of 904, the UE may, at 904B, measure at least one DL RSSI associated with one or more DL resources of the set of resources. In some aspects, as part of 904, the UE may, at 904C, estimate at least one CLI RSSI based on the at least one DL RSSI and the total RSSI. In some aspects, at 905, which may be part of 904, the UE may identify and distinguish an UL spectrum from a DL spectrum associated with the at least one resource. In some aspects, the DL spectrum may span a wider BW and may be associated with a more uniform PSD compared to the UL spectrum.

At 906, the UE may select a RO or a cell of the one or more cells based on the acquired information about the at least one of the FD operation or the CLI. For example, the UE 602 may select a RO or a cell of the one or more cells based on the acquired information about the at least one of the FD operation or the CLI at 609. In some aspects, 906 may be performed by access component 1142 in FIG. 11. In some aspects, the cell of the one or more cells may be a cell with a reduced chance of a high CLI. In some aspects, the set of resources may be selected based on the configuration, the configuration being a TDD configuration or a BWP configuration. In some aspects, the information about the FD operation or CLI may be based on one or more FD resources. In some aspects, as part of 906, at 908, the UE may determine that the at least one resource may include at least one UL resource and at least one DL resource. In some aspects, as part of 906, at 910, the UE may determine that a cell associated with the at least one resource is an FD cell.

Figure 10:
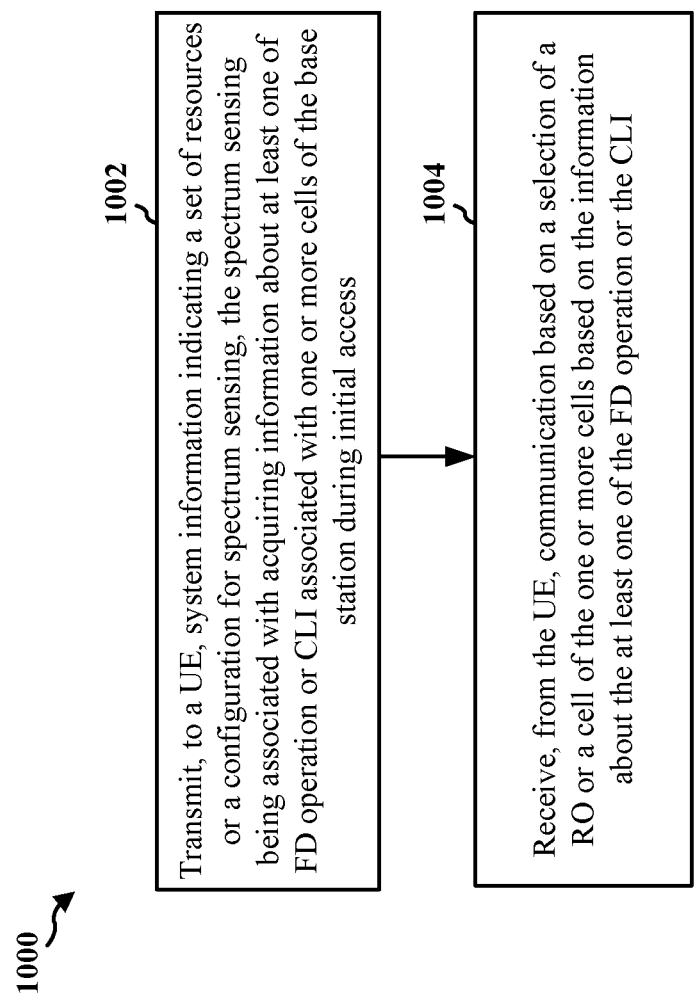
FIG. 10 is a flowchart of a method of wireless communication.

FIG. 10 is a flowchart 1000 of a method of wireless communication. The method may be performed by a base station (e.g., the base station 102/180, the base station 604; the apparatus 1202).

At 1002, the base station may transmit, to a UE, system information indicating a set of resources or a configuration for spectrum sensing, the spectrum sensing being with acquiring information about at least one of FD operation or CLI associated with one or more cells of the base station during initial access. For example, the base station 604 may transmit, to a UE 602, system information 606 indicating a set of resources or a configuration for spectrum sensing, the spectrum sensing being associated with acquiring information about at least one of FD operation or CLI associated with one or more cells of a base station during initial access. In some aspects, 1002 may be performed by access component 1242 in FIG. 12. In some aspects, the set of resources may include one or more time domain resources including one or more UL or FD symbols or slots associated with the spectrum sensing. In some aspects, the one or more UL or FD symbols or slots associated with the spectrum sensing may include all UL symbols or slots, all flexible symbols or slots, or all FD symbols or slots associated with a TDD configuration. In some aspects, the set of resources may include one or more frequency domain resources. In some aspects, the one or more frequency domain resources may include an initial UL BWP. In some aspects, the one or more frequency domain resources may include a dedicated BWP for the FD operation. In some aspects, the one or more frequency domain resources may include a collection of staggered RB groups. In some aspects, the one or more frequency domain resources may include at least one different frequency domain resource associated with at least one different time domain resource. In some aspects, the set of resources may include a time window prior to the RO. In some aspects, the configuration may include one or more conditions associated with a selection of the RO or the one or more cells (e.g., one cell of the one or more cells). In some aspects, the one or more conditions may include one or more of: an average RSSI threshold, a highest RSSI threshold, or a number of resources associated with an RSSI above a threshold. In some aspects, the set of resources may overlap with a set of resources configured for UL communication for a connected UE. In some aspects, the one or more FD resources may include one or more TDD indications in RMSI.

At 1004, the base station may receive, from the UE, communication based on a selection of a RO or a cell of the one or more cells based on the information about at least one of FD operation or CLI. For example, the base station 604 may receive, from the UE 602, communication (e.g., the Msg 1 610) based on a selection of a RO or a cell of the one or more cells based on the FD operation or CLI (e.g., at 609). In some aspects, 1004 may be performed by access component 1242 in FIG. 12.

Figure 11:
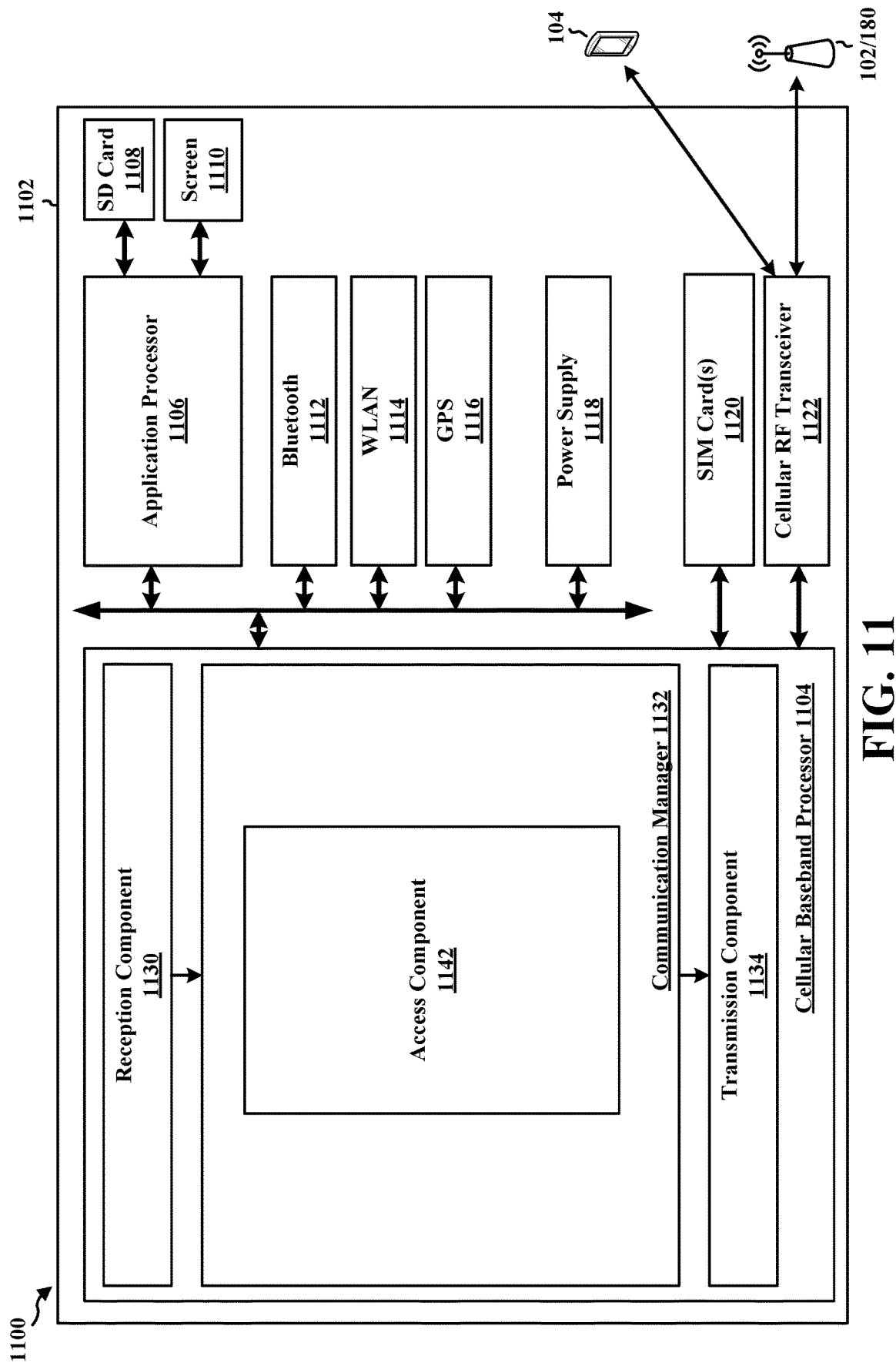
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include an access component 1142 that is configured to receive, from a base station, system information indicating a set of resources or a configuration for spectrum sensing, e.g., as described in connection with 802 in FIGS. 8 and 902 in FIG. 9. The access component 1142 may be further configured to perform a spectrum sensing based on a set of resources or a configuration to acquire information about at least one of FD operation or CLI associated with one or more cells of a base station during initial access, e.g., as described in connection with 804 in FIGS. 8 and 904 in FIG. 9. The access component 1142 may be further configured to select a RO or a cell of the one or more cells based on the acquired information about the at least one of the FD operation or the CLI, e.g., as described in connection with 806 in FIGS. 8 and 906 in FIG. 9. The access component 1142 may be further configured to identify and distinguish an UL spectrum from a DL spectrum associated with the at least one resource, determine that the at least one resource includes at least one UL resource and at least one DL resource, or determine that a cell associated with the at least one resource is an FD cell, e.g., as described in connection with 905, 908, and 910 in FIG. 9.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, may include means for receiving, from a base station, system information indicating a set of resources or a configuration for spectrum sensing. The cellular baseband processor 1104 may further include means for performing a spectrum sensing based on a set of resources or a configuration to acquire information about at least one of FD operation or CLI associated with one or more cells of a base station during initial access. The cellular baseband processor 1104 may further include means for selecting a RO or a cell of the one or more cells based on the acquired information about the at least one of the FD operation or the CLI. The cellular baseband processor 1104 may further include means for measuring at least one total RSSI associated with at least one resource of the set of resources. The cellular baseband processor 1104 may further include means for measuring at least one DL RSSI associated with one or more DL resources of the set of resources. The cellular baseband processor 1104 may further include means for estimating at least one CLI RSSI based on the at least one DL RSSI and the total RSSI. The cellular baseband processor 1104 may further include means for identifying and distinguishing an UL spectrum from a DL spectrum associated with the at least one resource. The cellular baseband processor 1104 may further include means for determining that the at least one resource includes at least one UL resource and at least one DL resource. The cellular baseband processor 1104 may further include means for determining that a cell associated with the at least one resource is an FD cell. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
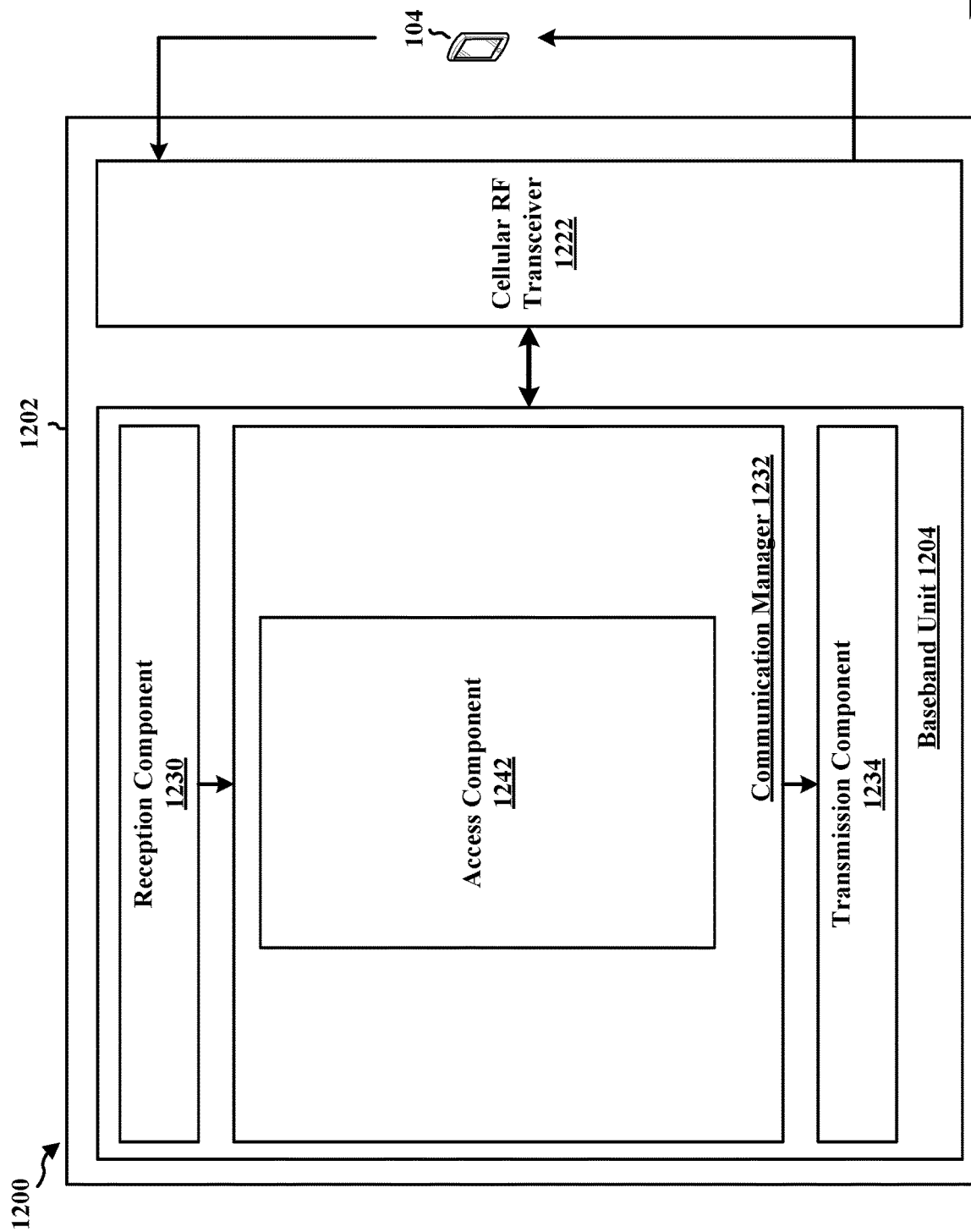
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include an access component 1242 that may transmit, to a UE, system information indicating a set of resources or a configuration for spectrum sensing, the spectrum sensing being associated with acquiring information about at least one of FD operation or CLI associated with one or more cells of the base station during initial access or receive, from the UE, communication based on a selection of a RO or a cell of the one or more cells based on the information about at least one of FD operation or CLI, e.g., as described in connection with 1002 and 1004 in FIG. 10.

The apparatus may include additional components that perform each of the blocks of the algorithm in the flowchart of FIG. 10. As such, each block in the flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, may include means for transmitting, to a UE, system information indicating a set of resources or a configuration for spectrum sensing, the spectrum sensing being associated with acquiring information about at least one of FD operation or CLI associated with one or more cells of the base station during initial access. The baseband unit 1204 may further include means for receiving, from the UE, communication based on a selection of a RO or a cell of the one or more cells based on the information about at least one of FD operation or CLI. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

For an FD TRP of a base station communication with a first UE and a second UE that may be both HD, the HD UEs may benefit from the potential advantages of latency saving, better spectrum efficiency, or other efficiencies resulting from the base station operating in FD. On the other hand, the HD UEs may also experience extra CLI between the HD UEs due to the FD operations of the TRP. For example, during a slot where the first UE receives DL communications, the nearby second UE may be sending UL communications to the TRP, which may potentially cause CLI to the first UE. Aspects provided herein may use spectrum sensing during the initial access for cell selection or RO selection.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: perform a spectrum sensing based on a set of resources or a configuration to acquire information about at least one of FD operation or CLI associated with one or more cells of a base station during initial access; and select a RO or a cell of the one or more cells based on the acquired information about the at least one of the FD operation or the CLI.

Aspect 2 is the apparatus of any of aspects 1, wherein the set of resources comprises one or more time domain resources comprising one or more UL or FD symbols or slots associated with the spectrum sensing.

Aspect 3 is the apparatus of any of aspects 2, wherein the one or more UL or FD symbols or slots associated with the spectrum sensing comprise all UL symbols or slots, all flexible symbols or slots, or all FD symbols or slots associated with a TDD configuration.

Aspect 4 is the apparatus of any of aspects 1, wherein the set of resources comprises one or more frequency domain resources.

Aspect 5 is the apparatus of any of aspects 1-4, wherein the one or more frequency domain resources comprise an initial UL BWP.

Aspect 6 is the apparatus of any of aspects 1-5, wherein the one or more frequency domain resources comprise a dedicated BWP for the FD operation.

Aspect 7 is the apparatus of any of aspects 1-6, wherein the one or more frequency domain resources comprise a collection of staggered RB groups.

Aspect 8 is the apparatus of any of aspects 1-7, wherein the one or more frequency domain resources comprise at least one different frequency domain resource associated with at least one different time domain resource.

Aspect 9 is the apparatus of any of aspects 1-8, wherein the set of resources comprises a time window prior to the RO.

Aspect 10 is the apparatus of any of aspects 1-9, wherein the configuration comprises one or more conditions associated with a selection of the RO or the one or more cells.

Aspect 11 is the apparatus of any of aspects 1-10, wherein the one or more conditions comprise one or more of: an average RSSI threshold, a highest RSSI threshold, or a number of resources associated with an RSSI above a threshold.

Aspect 12 is the apparatus of any of aspects 1-11, wherein the set of resources overlaps with a set of resources configured for UL communication for a connected UE.

Aspect 13 is the apparatus of any of aspects 1-12, wherein the cell of the one or more cells is a cell with a reduced chance of a high CLI.

Aspect 14 is the apparatus of any of aspects 1-13, wherein the set of resources is selected based on the configuration, the configuration being a TDD configuration or a BWP configuration.

Aspect 15 is the apparatus of any of aspects 1-14, wherein the information about the at least one of the FD operation or the CLI is acquired based on one or more FD resources.

Aspect 16 is the apparatus of any of aspects 1-15, wherein the one or more FD resources comprise one or more TDD indications in RMSI.

Aspect 17 is the apparatus of any of aspects 1-16, wherein the at least one processor is further configured to: measure at least one total RSSI associated with at least one resource of the set of resources.

Aspect 18 is the apparatus of any of aspects 1-17, wherein the at least one processor is further configured to: measure at least one DL RSSI associated with one or more DL resources of the set of resources; and estimate at least one CLI RSSI based on the at least one DL RSSI and the total RSSI.

Aspect 19 is the apparatus of any of aspects 1-17, wherein the at least one processor is further configured to: identify and distinguish an UL spectrum from a DL spectrum associated with the at least one resource.

Aspect 20 is the apparatus of any of aspects 19, wherein the DL spectrum spans a wider BW or is associated with a more uniform PSD compared to the UL spectrum.

Aspect 21 is the apparatus of any of aspects 1-20, wherein the at least one processor is further configured to: determine that the at least one resource comprises at least one UL resource and at least one DL resource.

Aspect 22 is the apparatus of any of aspects 1-21, wherein the at least one processor is further configured to: determine that a cell associated with the at least one resource is an FD cell.

Aspect 23 is the apparatus of any of aspects 1-22, further comprising a transceiver coupled to the at least one processor.

Aspect 24 is an apparatus for wireless communication at a base station, comprising: a memory; and at least one processor coupled to the memory and configured to: transmit, to a UE, system information indicating a set of resources or a configuration for spectrum sensing, the spectrum sensing being associated with acquiring information about at least one of FD operation or CLI associated with one or more cells of the base station during initial access; and receive, from the UE, communication based on a selection of a RO or a cell of the one or more cells based on the information about the at least one of the FD operation or the CLI.

Aspect 25 is the apparatus of aspect 24, wherein the set of resources comprises one or more time domain resources comprising one or more UL or FD symbols or slots associated with the spectrum sensing.

Aspect 26 is the apparatus of any of aspects 24-25, wherein the one or more UL or FD symbols or slots associated with the spectrum sensing comprises all UL symbols or slots, all flexible symbols or slots, or all FD symbols or slots associated with a TDD configuration.

Aspect 27 is the apparatus of any of aspects 24-26, wherein the set of resources comprises one or more frequency domain resources.

Aspect 28 is the apparatus of any of aspects 24-27, further comprising a transceiver coupled to the at least one processor.

Aspect 29 is a method of wireless communication for implementing any of aspects 1 to 23.

Aspect 30 is an apparatus for wireless communication including means for implementing any of aspects 1 to 23.

Aspect 31 is a computer-readable medium storing computer executable code, where the code when executed by a processor causes the processor to implement any of aspects 1 to 23.

Aspect 32 is a method of wireless communication for implementing any of aspects 24 to 28.

Aspect 33 is an apparatus for wireless communication including means for implementing any of aspects 24 to 28.

Aspect 34 is a computer-readable medium storing computer executable code, where the code when executed by a processor causes the processor to implement any of aspects 24 to 28.

What is claimed is:

1. An apparatus for wireless communication at a user equipment (UE), comprising:
   memory; and
   at least one processor coupled to the memory and configured to:
      perform, during initial access, a spectrum sensing based on a set of resources or a configuration to acquire information about full-duplex (FD) operation and cross link interference (CLI) associated with one or more cells of a base station, wherein to perform the spectrum sensing, the at least one processor is configured to:
         separately measure a first subset of downlink resources of the set of resources and a second subset of full-duplex resources of the set of resources, wherein the first subset of downlink resources is without corresponding uplink transmission of the UE, and wherein the second subset of full-duplex resources is associated with at least one uplink transmission of the UE; and identify a difference between a first measurement associated with the first subset of downlink resources and a second measurement associated with the second subset of full-duplex resources associated with the at least one uplink transmission of the UE to be corresponding to a CLI associated with at least other UE separate from the UE; and select a random access channel (RACH) occasion (RO) or a cell of the one or more cells based on the acquired information about the FD operation and the CLI.

2. The apparatus of claim 1, wherein the set of resources comprises one or more time domain resources comprising one or more uplink (UL) or FD symbols or slots associated with the spectrum sensing.

3. The apparatus of claim 2, wherein the one or more UL or FD symbols or slots associated with the spectrum sensing comprise all UL symbols or slots, all flexible symbols or slots, or all FD symbols or slots associated with a time division duplex (TDD) configuration.

4. The apparatus of claim 1, wherein the set of resources comprises one or more frequency domain resources.

5. The apparatus of claim 4, wherein the one or more frequency domain resources comprise an initial uplink (UL) bandwidth part (BWP).

6. The apparatus of claim 4, wherein the one or more frequency domain resources comprise a dedicated bandwidth part (BWP) for the FD operation.

7. The apparatus of claim 4, wherein the one or more frequency domain resources comprise a collection of staggered resource block (RB) groups.

8. The apparatus of claim 4, wherein the one or more frequency domain resources comprise at least one different frequency domain resource associated with at least one different time domain resource.

9. The apparatus of claim 1, wherein the set of resources comprises a time window prior to the RO.

10. The apparatus of claim 1, wherein the configuration comprises one or more conditions associated with a selection of the RO or the one or more cells.

11. The apparatus of claim 10, wherein the one or more conditions comprise one or more of: an average received signal strength indicator (RSSI) threshold, a highest RSSI threshold, or a number of resources associated with an RSSI above a threshold.

12. The apparatus of claim 10, wherein the set of resources overlaps with a set of resources configured for UL communication for a connected UE.

13. The apparatus of claim 1, wherein the cell of the one or more cells is a cell with a reduced chance of a high CLI.

14. The apparatus of claim 1, wherein the set of resources is selected based on the configuration, the configuration being a time division duplex (TDD) configuration or a bandwidth part (BWP) configuration.

15. The apparatus of claim 1, wherein the information about the FD operation and the CLI is acquired based on one or more FD resources.

16. The apparatus of claim 1, wherein the one or more FD resources comprise one or more time division duplex (TDD) indications in remaining minimum system information (RMSI).

17. The apparatus of claim 1, wherein the at least one processor is further configured to:
measure at least one total received signal strength indicator (RSSI) associated with at least one resource of the set of resources.

18. The apparatus of claim 17, wherein the at least one processor is further configured to:
measure at least one DL RSSI associated with one or more DL resources of the set of resources; and
estimate at least one CLI RSSI based on the at least one DL RSSI and the total RSSI.

19. The apparatus of claim 17, wherein the at least one processor is further configured to:
identify and distinguish an UL spectrum from a DL spectrum associated with the at least one resource.

20. The apparatus of claim 19, wherein the DL spectrum spans a wider bandwidth (BW) or is associated with a more uniform power spectrum density (PSD) compared to the UL spectrum.

21. The apparatus of claim 19, wherein the at least one processor is further configured to:
determine that the at least one resource comprises at least one UL resource and at least one DL resource.

22. The apparatus of claim 21, wherein the at least one processor is further configured to:
determine that a cell associated with the at least one resource is an FD cell.

23. The apparatus of claim 1, further comprising a transceiver coupled to the at least one processor, wherein the at least one processor is further configured to:
receive, from the base station, system information indicating the set of resources or the configuration for the spectrum sensing.

24. An apparatus for wireless communication at a base station, comprising:
memory; and
at least one processor coupled to the memory and configured to:
transmit, to a user equipment (UE) during initial access, system information indicating a set of resources or a configuration for spectrum sensing, the spectrum sensing being associated with acquiring information about full-duplex (FD) operation and cross link interference (CLI) associated with one or more cells of the base station;
configure, in the configuration for the spectrum sensing, a first subset of downlink resources of the set of resources and a second subset of full-duplex resources of the set of resources, wherein the first subset of downlink resources is without corresponding uplink transmission of the UE, and wherein the second subset of full-duplex resources is associated with at least one uplink transmission of the UE; and
receive, from the UE, communication based on a selection of a random access channel (RACH) occasion (RO) or a cell of the one or more cells based on the information about the FD operation and the CLI.

25. The apparatus of claim 24, wherein the set of resources comprises one or more time domain resources comprising one or more uplink (UL) or FD symbols or slots associated with the spectrum sensing.

26. The apparatus of claim 25, wherein the one or more UL or FD symbols or slots associated with the spectrum sensing comprises all UL symbols or slots, all flexible symbols or slots, or all FD symbols or slots associated with a time division duplex (TDD) configuration.

27. The apparatus of claim 24, wherein the set of resources comprises one or more frequency domain resources.

28. The apparatus of claim 24, further comprising a transceiver coupled to the at least one processor.

29. A method for wireless communication at a user equipment (UE), comprising:
- performing, during initial access, a spectrum sensing based on a set of resources or a configuration to acquire information about full-duplex (FD) operation and cross link interference (CLI) associated with one or more cells of a base station, wherein performing the spectrum sensing comprises:
  - separately measuring a first subset of downlink resources of the set of resources and a second subset of full-duplex resources of the set of resources, wherein the first subset of downlink resources is without corresponding uplink transmission of the UE, and wherein the second subset of full-duplex resources is associated with at least one uplink transmission of the UE; and
  - identifying a difference between a first measurement associated with the first subset of downlink resources and a second measurement associated with the second subset of full-duplex resources associated with the at least one uplink transmission of the UE to be corresponding to a CLI associated with at least other UE separate from the UE; and
- selecting a random access channel (RACH) occasion (RO) or a cell of the one or more cells based on the acquired information about the FD operation and the CLI.

30. A method for wireless communication at a base station, comprising:
- transmitting, to a user equipment (UE) during initial access, system information indicating a set of resources or a configuration for spectrum sensing, the spectrum sensing being associated with acquiring information about full-duplex (FD) operation and cross link interference (CLI) associated with one or more cells of the base station;
- configuring, in the configuration for the spectrum sensing, a first subset of downlink resources of the set of resources and a second subset of full-duplex resources of the set of resources, wherein the first subset of downlink resources is without corresponding uplink transmission of the UE, and wherein the second subset of full-duplex resources is associated with at least one uplink transmission of the UE; and
- receiving, from the UE, communication based on a selection of a random access channel (RACH) occasion (RO) or a cell of the one or more cells based on the information about the FD operation and the CLI.

* * * * *